Claude P. Charamond,
James D. Broyles and
John T. Hancock,
    Inventors.
Hoenig, Senniger, Powers and Leavitt,
            Attorneys.

United States Patent Office 3,404,465
Patented Oct. 8, 1968

3,404,465
DRYER CONTROL
Claude P. Charamond, Versailles, James D. Broyles, Lexington, and John T. Hancock, Versailles, Ky., assignors to Texas Instruments Incorporated, Dallas, Tex., a corporation of Delaware
Filed Jan. 11, 1967, Ser. No. 608,564
17 Claims. (Cl. 34—45)

ABSTRACT OF THE DISCLOSURE

An automatic control for a clothes dryer is disclosed in which manual controls, an electronic dryness sensing circuit, and electric power switching components are combined in an integrated assembly. A switch which is manually closed to energize the dryer is held in closed position by a latch and the latch is selectively released by a solenoid which is energized by the electronic dryness sensing circuit when a preselected level of dryness is reached.

Background of the invention

This invention relates to dryer controls and more particularly to such controls which automatically deenergize drying means when a load being dryed reaches a predetermined level of dryness.

In automatic dryer controls known heretofore manually controlled and electronically controlled switching functions have been performed separately using different structures and, as a result, plural and/or redundant switching devices or relays have been required which added substantially to the cost of an automatic dryer control.

Summary of the invention

Among the several objects of the present invention may be noted the provision of an automatic dryer control in which manual and electronically controlled switching functions are integrated in a unitary assembly; the provision of such a dryer control which is compact; the provision of such a dryer control which is reliable; and the provision of such a dryer control which is relatively simple and inexpensive. Other objects and features will be in part apparent and in part pointed out hereinafter.

Briefly, a dryer control according to the present invention is operative to automatically deenergize drying means when a load being dryed reaches a predetermined level of dryness. Switch means are provided including contacts which energize the drying means when closed but which are normally biased toward an open position. A member is provided which can be manually moved into engagement with the switch means for closing the contacts against the normal bias. A latch retains the member in engagement with the switch means for maintaining the contacts in closed position. An electromagnetic means, such as a solenoid, is provided which, when energized, releases the latch. An electronic means responsive to the dryness of the load energizes the electromagnetic means to release the latch and deenergize the drying means when the load reaches the predetermined level of dryness.

Brief description of the drawings

Corresponding reference characters indicate corresponding parts throughout the several views of the drawings.

Description of the preferred embodiment

Figure 1:
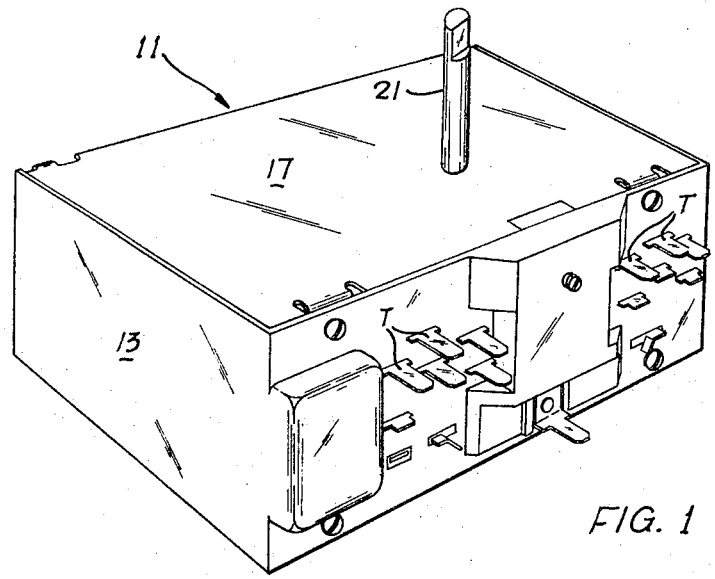
FIG. 1 is a perspective view of a dryer control according to this invention showing the bottom or terminal side of the control enclosure.

Referring now to the drawings there is indicated generally at 11 an integrated drying control of the present invention in which manual, electro-mechanical and electronic functions are combined in a unitary structure. Three sides of a housing for control 11 are constituted by a molded plastic frame or case 13. A plurality of conventional spade lug terminals T extend through the bottom side of case 13 for connecting the internal components of the control with various conventional components of a domestic clothes dryer, e.g., a motor which provides agitation and ventilation of a load to be dryed and a heater for warming the load to accelerate its drying. The front and back of the control housing are constituted by metal cover plates 17 and 19. Through the front cover plate 17 projects a plunger or control shaft 21 which is manually operable, as by means of a knob, to perform functions as described in greater detail hereinafter.

Figure 2:
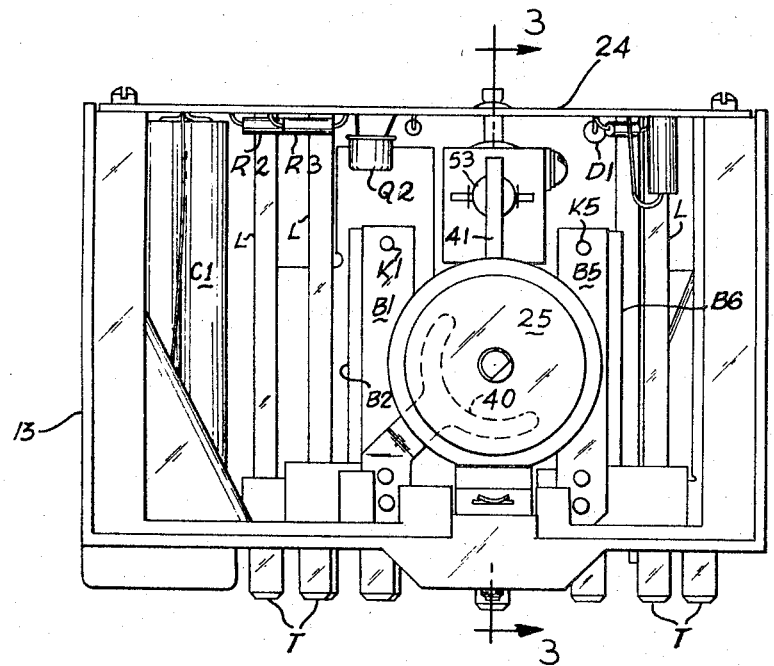
FIG. 2 is a front view of the control with a cover panel removed.

The remaining side or top of housing 11 is constituted by a printed circuit board 24 which provides support and interconnections for a plurality of electric components, such as resistors R2 and R3, diode D1, transistor Q2, and capacitor C1. As explained hereinafter, capacitor C1 is a filter or integrating capacitor of relatively large capacity and extends from circuit board 24 across the housing into a fitted recess in the opposite side wall of plastic case 13 (see FIG. 2).

Integral with certain of the terminals T are respective resilient contact blades B1–B9 which carry respective contacts K1–K9. Integral with others of the contacts K are conductive bar leads L which extend across the housing 11 and establish connections between the respective terminals T and printed circuit board 24.

Figure 6:
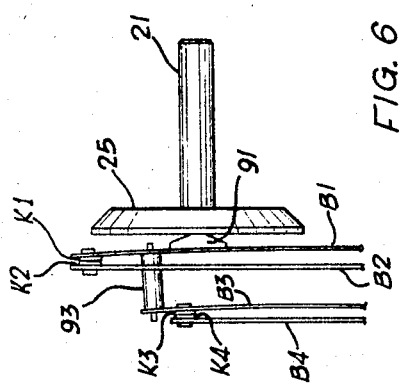
FIGS. 6 and 7 are views illustrating, in two different positions, the operation of various contacts by the plunger shaft assembly.
Figure 5:
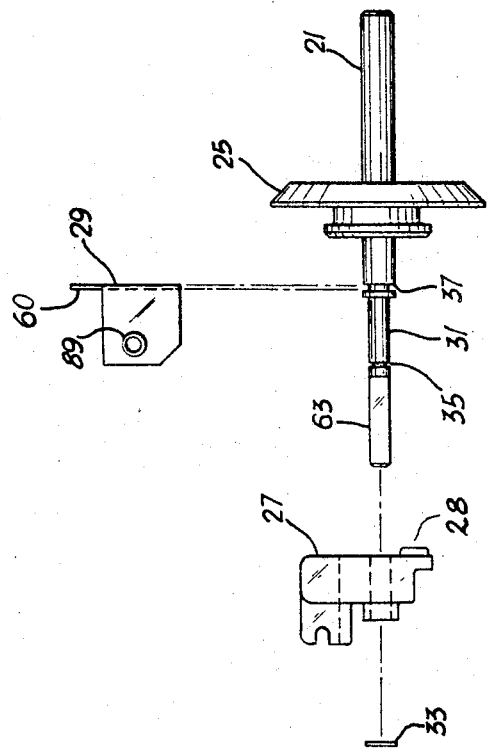
FIG. 5 is an exploded view of a plunger shaft assembly employed in the control.

Shaft 21 carries a contact operating disk member 25, a latch carrier block 27 and a shaped sheet metal clip 29. As is explained in greater detail hereinafter with reference to FIGS. 6 and 7, disk member 25 can be operated under control of shaft 21 to deflect various of the switch or contact blades thereby to make or break circuits passing through the respective contacts. Block 27 fits over a portion 31 of shaft 21 which is of reduced diameter (see FIG. 5) and is retained by a clip 33 which fits in an annular groove 35 in shaft 21. The length of portion 31 is slightly greater than the corresponding dimension of block 27 so that there is a lost-motion connection provided between shaft 21 and block 27. Thus, while block 27 will follow any long longitudinal movements of shaft 21, the shaft may be moved a short distance without moving block 27. Clip 29 fits generally around block 27 and fits within a groove 37 in shaft 21 for longitudinal movement therewith without lost motion.

Disk 25 fits over a portion of shaft 21 having a flatted side as indicated at 39 (FIG. 4) so that the disk 25 rotates with rather than with respect to shaft 21. Disk 25 is slidable longitudinally with respect to shaft 21 between first and second positions which are defined by the end of the flat surface 39 on one hand and a protrusion 28 on the block 27. Block 27 in turn is limited in its travel to the left by a lip 38 on first arm portion 69. Disk 25 is normally biased to the right as seen in FIGS.

3 and 4 by a bifurcated spring 40 (see FIG. 2) which is mounted on the bottom of case 13 with the terminals T and the various contact blades.

Figure 3:
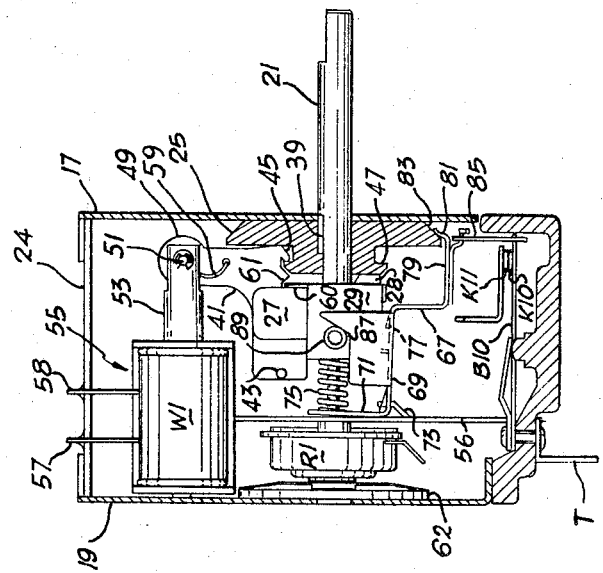
FIG. 3 is a view in section substantially on the line 3—3 of FIG. 2.
Figure 4:
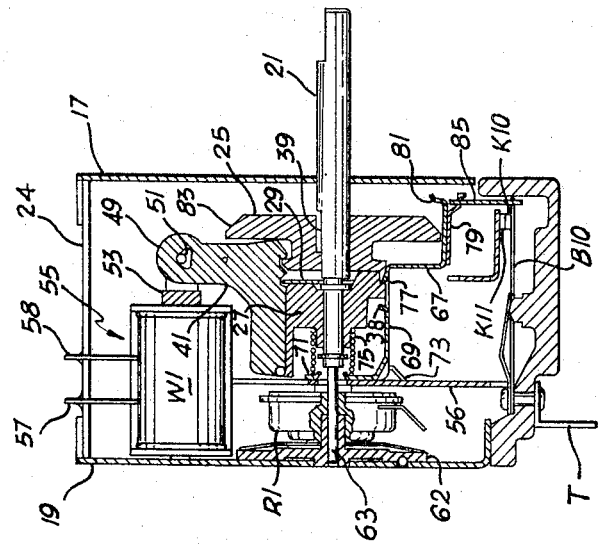
FIG. 4 is a view similar to FIG. 3 additional parts being broken away and with parts being shown in a moved position.

A latch member 41 is pivotally mounted on carrier block 27 as indicated at 43. Latch member 41 includes a hook portion 45 which, as illustrated in FIGS. 3 and 4, is adapted to engage an annular rim 47 on disk 25 for holding the disk in its second or left-hand position in relation to shaft 21. Latch member 41 also includes an arm portion 49 which is connected by a lost-motion pin connection, as indicated at 51, to the movable core 53 of a solenoid indicated generally at 55. Solenoid 55 is supported on a sheet metal frame 56 mounted within case 13 and includes an operating winding W1 from which terminals 57 and 58 extend to circuit board 24. A spring 59 urges the hook portion 45 of latch member 41 into engagement with the rim 47 on disk 25. As may be seen by comparing FIGS. 3 and 4, the solenoid core 53 moves with latch member 41 and block 27 when the shaft is moved longitudinally. In the position shown in FIG. 4, the core 53 is nearly seated and at almost the end of its stroke in the solenoid and thus a relatively large force can be produced by a relatively small current in winding W1.

Clip 29 includes a lip portion 60 which engages a ramp or cam surface 61 on latch member 41 if the clip is moved by shaft 21 to the right as seen in FIG. 4 within the movement permitted by the lost-motion connection between shaft 21 and block 27 described previously. This engagement between lip 60 and surface 61 is operative to cam the hook portion 45 of latch member 41 out of engagement with rim 47 on disk 25.

Frame 56 also supports a rheostat R1 in alignment with shaft 21 and a conventional spring loaded ball detent mechanism 62 is mounted on the back panel 19 in alignment with rheostat R1. Shaft 21 includes a flatted portion 63 (see FIG. 5) for transmitting rotational motion to rheostat R1 and detent mechanism 62 in conventional manner while permitting the shaft itself to slide longitudinally relative to the housing 11 and frame 56 between a right-hand or first position as shown in FIG. 3 and a left-hand or second position as shown in FIG. 4. In place of rheostat R1, a switch may be used to select between resistors of different values.

The control includes also a second latch member indicated generally at 67. This second latch member includes a first arm portion 69 which extends generally along plunger shaft 21 and a second arm portion 71 which extends generally transversely to shaft 21 and through which the shaft passes. Latch member 67 is maintained in proper orientation around shaft 21 by a tab or tongue 73 struck up from the sheet metal frame 56 and the latch member can be pivoted or rocked about this reference point. A helical compression spring 75 surrounds the portion of shaft 21 between latch arm 71 and the carrier block 27. The right-hand end of spring 75 urges block 27, and thus also the plunger shaft 21, to the right while the left-hand end of this spring urges the latch arm 71 to the left thereby tending to pivot the latch member 67 in a counterclockwise direction around tab 73.

The latch arm portion 69 which extends generally along shaft 21 includes a tab or lip 77 which constitutes a sear surface and which is adapted to engage the carrier block 27 and to hold it and shaft 21 in the second or left-hand position against the bias of spring 75. Latch member 67 also includes an extension 79 having a surface 81 which is adapted to be engaged by a beveled edge 83 on the disk 25 as it moves from left to right. This engagement pivots the latch member 67 slightly in a clockwise direction around tab 73 thereby releasing the carrier block from the sear surface 77 and allowing the plunger shaft 21 to move to the right under the bias of spring 75.

Extension 79 is coupled, through an insulating link 85, to a movable contact blade B10. Contact blade B10 is preferably of a buckled or prestressed type providing a snap action and carries a movable contact K10 which cooperates with a fixed contact K11.

Latch member 67 further includes a cam portion 87 which is engageable by a circular extrusion or boss 89 on clip 29 when the clip is moved to its extreme right by shaft 21 within the lost motion permitted by the connection between shaft 21 and block 27 as described previously. When shaft 21 is pulled to its extreme right-hand position this boss cams latch member 67 in a clockwise direction further than it is normally driven by the engagement of the beveled edge on disk 25 against surface 81. This further movement is operative to snap open the contacts K10 and K11 (not shown). When shaft 21 is pushed to the left, the resultant pressure on spring 75 drives latch member 67 in the counterclockwise direction thereby closing the contacts K10 and K11.

The contact blades B1 and B5 (see FIGS. 2, 6 and 7) carry insulating plastic followers 91 which are adapted to be engaged by disk 25 when the shaft 21 is held in its left-hand position by the engagement of latch member 67 with the carrier block 27 and the disk is held in its left-hand position with respect to shaft 21 by the latch member 41. In this condition the disk 25 operates to deflect blade B1 and thereby bring contact K1 into engagement with contact K2 and also, although not visible in the drawings, to deflect blade B5 to bring contact K5 into engagement with contact K6. The movement of switch contact blade B1 is transmitted, through an insulating coupler pin 93, to contact blade B3 thereby moving its respective contact K3 into engagement with contact K4. The movement of blade B5 described previously is also transmitted through a similar insulating coupler pin to blade B8 which moves respective contact K8 from contact K7 to contact K9, the contacts K7–K9 thus constituting a double-throw switch.

Figure 7:
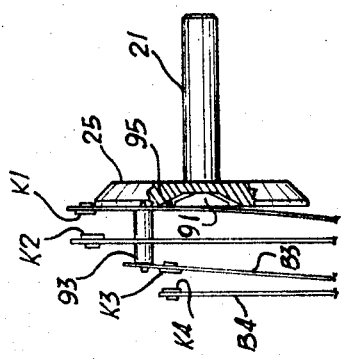

Even though the disk 25 and shaft 21 are in their left-hand positions, the contacts K1 and K2 and the contacts K3 and K4 may be selectively opened by a rotating shaft 21 and disk 25 to a predetermined angular position so that the follower 91 falls into a recess 95 in the inner surface of disk 25 (see FIG. 7). Preferably this rotational position is one of those which is resiliently retained by the detent mechanism 62.

Figure 8:
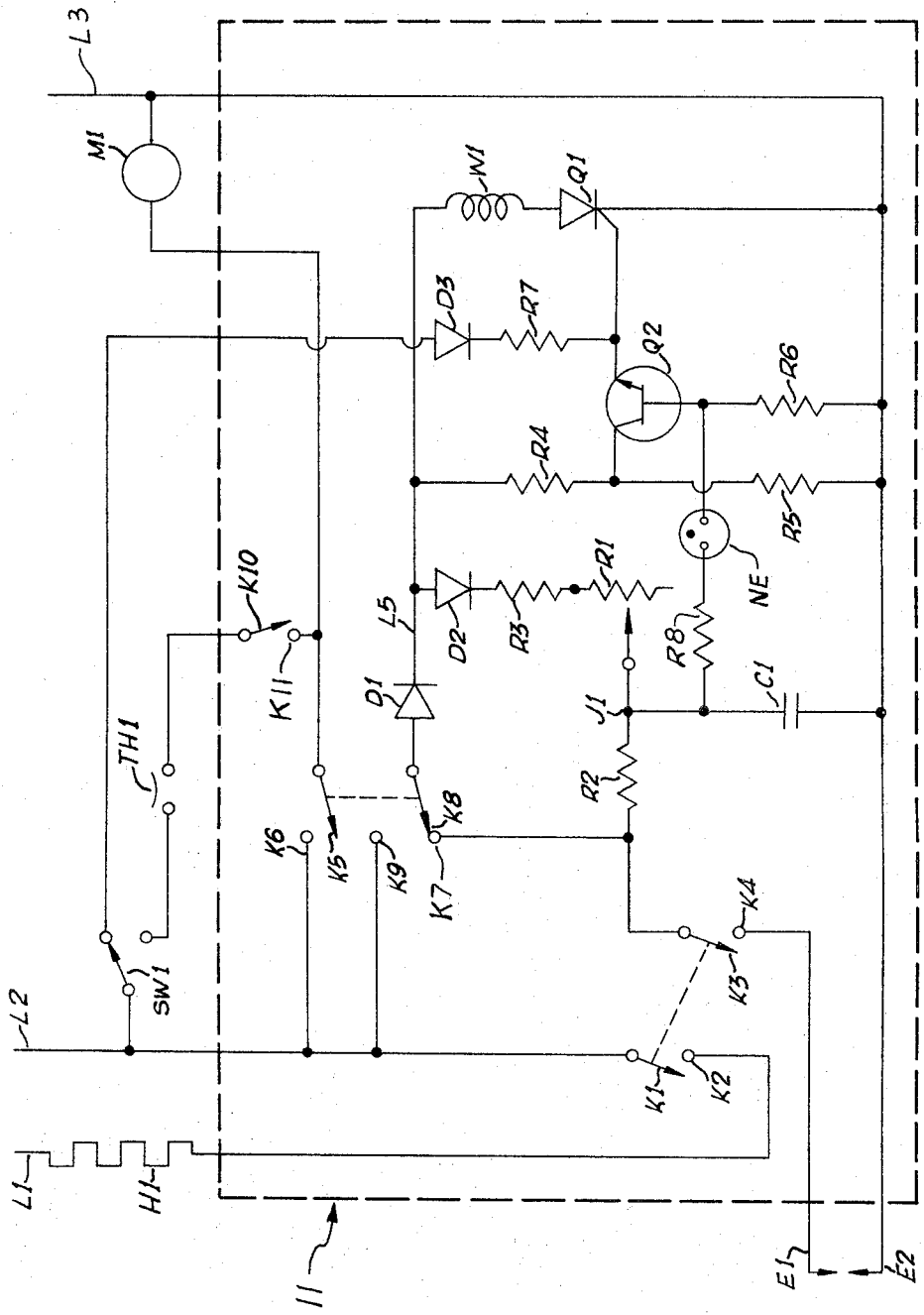
FIG. 8 is a schematic circuit diagram of an electronic dryness sensing circuit employed in this control.

Referring now to the circuit diagram of FIG. 8, there are indicated at L1, L2 and L3 leads for providing A.C. power to the dryer. Lead L3 is the common or ground connection while leads L1 and L2 each provide A.C. at at 110 volts with respect to ground, leads L1 and L2 being out-of-phase so that there is a total of 220 volts A.C. between leads L1 and L2. The conventional dryer components with which the control of the present invention is employed include a motor M1 for agitating and ventilating a load to be dried and a heater H1 for warming the load to accelerate its drying. The physical arrangement of such components is well known and is not illustrated herein. Heater H1 is connected across the leads L1 and L2 through a circuit which includes the cooperating contacts K1 and K2. Heater H1 is thus energized at 220 volts A.C. when these contacts are closed. The motor M1 is connected across leads L2 and L3 by alternate circuits one of which includes the contacts K5 and K6 and the other of which includes the switch contacts K10 and K11, a cool-down thermostat TH1 and the normally open side of a double-throw door switch SW1.

The electronic dryness sensing circuit which is assembled on the printed circuit board 24 is supplied with electric power through the normally open contacts K8 and K9. The normally closed contacts K8 and K7 are operative to discharge capacitor C1 when the dryer is not operating. A diode D1 is connected to contact K8 for providing half wave rectified current to a supply lead L5. Winding W1 is connected between lead L5 and Lead L3 through the anode-cathode circuit of an SCR (silicon controlled rectifier) Q1 to be selectively energized thereby when the SCR is triggered.

The dryer includes a pair of conventional electrodes E1 and E2 which are adapted to contact the load being dried thereby to provide a current path the resistance of which varies in known manner as the load dries. This variable resistance current path is connected, through contacts K3 and K4, in a voltage divider circuit which also includes a resistor R2, the rheostat R1 described previously, a resistor R3 and a diode D2. This voltage divider is connected between lead L5 and lead L3 and is operative to provide at a junction J1 a voltage signal which varies as a function of the resistance between electrodes E1 and E2 and hence also as a function of the dryness of the load being dried. Junction J1 is connected to ground through the capacitor C1. Capacitor C1 performs a filtering or integrating function and for this purpose is of relatively large value so the voltage at junction J1 varies only relatively slowly. In other words the voltage divider-capacitor circuit has a long time constant, e.g., in the order of seven seconds, and thus the voltage at junction J1 does not vary significantly in response to transient variations in the resistance between electrodes E1 and E2.

Junction J1 is connected, through a current limiting resistor R8 and a neon glow tube NE, to the base terminal of an NPN transistor Q2 which is operated as an amplifier. The collector terminal of transistor Q2 is provided with power from line L5 through a voltage divider comprising a pair of resistors R4 and R5. Transistor Q2 is normally biased to cut off by a resistor R6 which connects its base terminal to lead L3. The emitter terminal of transistor Q2 is connected to the gate terminal of SCR Q1 for triggering the SCR into conduction when transistor Q2 conducts. The gate terminal of SCR Q1 is also connected, through a current limiting resistor R7 and a blocking diode D3, to the normally closed side of the double-throw door switch SW1.

The operation of this control during a normal drying cycle is as follows. When the dryer is loaded with damp clothes and the door thereof closed, the switch SW1 is operated to a position opposite that shown in FIG. 8. Assuming that the hook portion 45 of the latch member 41 is engaged with the rim 47 on disk 25, pressing inwardly on the shaft 21 will then carry disk 25 back into engagement with the various switch contact blades. As the shaft 21 is depressed, the lip or sear surface 77 on latch member 67 engages the carrier block 27 thereby retaining the shaft in its second or left-hand position as illustrated in FIG. 4.

The closing of the contacts K1 and K2 energizes the heater H1 while the closing of contacts K5 and K6 energizes the motor M1. The dryer is thus set into operation and heat from heater H1 causes cooldown thermostat TH1 to close. As the contacts K1–K2 and K5–K6 are closed, the contacts K3–K4 and K7–K9 which are mechanically coupled respectively thereto are also operated to positions which are the opposite of those illustrated in FIG. 8. Engagement of contact K8 and K9 applies power to the electronic dryness sensing circuitry while the closing of contacts K3 and K4 connects the dryness sensing electrodes E1 and E2 across capacitor C1. Shaft 21 may be rotated either before or after it is depressed to set rheostat R1 at a value which represents a preselected level of dryness to be attained.

As is understood by those skilled in the art, the voltage provided at junction J1 is a filtered or time integrated function of the resistance sensed by the electrodes E1 and E2. When the clothes are relatively damp, the average resistance between electrodes E1 and E2 is quite low in relation to the resistances of resistor R3 and rheostat R1 and only a relatively low voltage is generated at junction J1.

As the load dries, the average resistance between electrodes E1 and E2 increases so that the voltage at junction J1 and the charge on capacitor C1 also increase. As is understood by those skilled in the art, neon bulb NE exhibits avalanche type operating characteristics and, when the voltage across capacitor C1 reaches a predetermined ignition threshold, the bulb ionizes and applies energy stored in capacitor C1 to the base of transistor Q1 in the form of a positive current pulse. This positive pulse forward biases transistor Q2 and causes an amplified pulse to be applied to the gate electrode of SCR Q1. SCR Q1 therefore conducts and energizes the solenoid winding W1. The particular level of dryness at which this occurs may be selected by adjusting rheostat R1. Because of capacitor C1, the system has a relatively long time constant as noted previously and does not respond to transient variations in the dryness sensing resistance which would, if the capacitor were not provided, cause premature termination of the drying cycle.

When winding W1 is energized, its core 53 is drawn to the left as seen in FIGS. 3 and 4 thereby pulling the hook portion 45 of latch member 41 out of engagement with rim 47 on disk 25. As noted previously, the solenoid core 53 is near the end of its stroke even before winding W1 is energized and thus substantial force is available to release the latch. When released by the latch member 41, disk 25 moves to the right under the bias of spring 40 and the resilience of the switch contact blades B1, B5, etc. The contacts K1–K2 thus open thereby deenergizing the heater H1 immediately.

As the disk 25 moves to the right, its beveled camming surface 83 strikes lip 81 on the latch member 67 pivoting it slightly clockwise around tab 73 and releasing the sear surface 77 from the carrier block 27. The carrier block 27 and shaft 21 may then move to the right under the bias of spring 75 so that the hook portion 45 of latch member 41 re-engages the rim 47 on disk 25. It should be noted that the deenergization of the drying heater H1 does not depend upon this movement of shaft 21 but only upon the movement of disk 25. Thus, the termination of the drying cycle is initiated in a trip-free mode, that is, the cycle will terminate even though the shaft 21 cannot move to its right-hand or first position, e.g., if its movement is blocked by the inadvertent placing of heavy articles on top of the dryer.

Although the contacts K5 and K6 are also opened by the movement of disk 25 to the right, motor M1 is not immediately deenergized in this normal mode of operation since an alternative power circuit is available through the door switch SW1, the cool-down thermostat TH1 and contacts K10 and K11. Accordingly, the motor M1 normally runs until the load cools down to a preselected temperature at which point thermostat TH1 opens deenergizing the motor. Thermostat TH1 is adjusted so that a clothes load being dried cools to a temperature sufficiently low to prevent setting of wrinkles. If, however, it is desired to deenergize the motor M1 before the trip temperature of cool-down thermostat TH1 is reached, switch contacts K10 and K11 may be opened by pulling on the shaft 21 so that the boss 89 on clip 29 operates on the cam surface 87 of latch member 67 as described previously.

The electronic circuit illustrated in FIG. 8 also provides an air fluff mode of operation in which a clothes load may be agitated and ventilated by the motor M1 without the application of heat by heater H1. To provide this mode of operation, the shaft 21 is rotated so that the follower 91 which operates contacts K1–K4 falls into the recess 95 in disk 25 as illustrated in FIG. 7. Thus, when the shaft 21 is depressed to energize the motor through contacts K5 and K6, the heater H1 remains deenergized and the sensing electrodes E1 and E2 are disconnected. This rotational positioning of shaft 21 also sets rheostat R1 to its maximum resistance value. Accordingly, when the electronic control circuit is energized by the engagement of contact K8 with contact K9, its operation is not dependent upon the resistance present between electrodes E1 and E2 but rather capacitor C1 is steadily charged through resistor R3 and rheostat R1. As capacitor C1 is of relatively large value as explained previously and since rheostat R1 is set to its maximum resistance value, a relatively long period is provided before the ignition threshold of bulb NE is reached, e.g., on the order of seven minutes. At the end of this time interval, the bulb NE breaks down causing the energization of solenoid winding W1 as described previously thereby terminating the cycle. Since no heat is provided in this mode of operation and the thermostat TH1 is therefore in an open condition, the motor M1 is deenergized immediately upon the opening of contacts K5 and K6.

If, for any reason, it is desired to terminate the operation of the dryer before the end of either a normal drying or a timed air fluff cycle, this may be accomplished by merely pulling on the shaft 21. Even though the block 27 is restrained by the sear surface 77, the clip 29 may be moved to the right for a short distance within the movement permitted by the lost-motion connection between shaft 21 and block 27 described previously. The lip 60 on clip 29 can thus be brought into engagement with the cam surface 61 on latch member 41 to move the hook portion 45 of member 41 out of engagement with the rim 47 on disk 25. The disk will thus move to the right as described previously thereby deenergizing the dryer and releasing the latch member 67 so that the block 27 and shaft 21 may then be moved to the right by spring 75 for resetting the mechanism.

The connection of the gate terminal of SCR Q1 to the door switch SW1 through resistor R7 and diode D3 is provided to completely deenergize the dryer immediately if for any reason the dryer door is open during dryer operation. Upon the opening of the door, the switch SW1 returns to the position illustrated in the drawing and current from line L2 triggers SCR Q1. SCR Q1 energizes solenoid winding W1 to deenergize heater H1 as described previously. The operation of switch SW1 itself prevents continued operation of motor M1 in the cool-down mode by breaking the circuit through the cool-down thermostat TH1.

In view of the above it will be seen that the several objects in the invention are achieved and other advantageous results attained.

As various changes could be made in the above constructions without departing from the scope of the invention it is intended that all matter contained in the above description or shown in the accompanying drawings shall be interpreted as illustrative and not in a limiting sense.

What is claimed is:

1. A dryer control for automatically deenergizing drying means when a load being dried reaches a predetermined level of dryness, said control comprising:
    switch means including contacts which energize said drying means when closed, said switch means further including spring means for biasing said contacts to an open position;
    a member which is manually movable into engagement with said switch means for closing said contacts against the bias of said spring means;
    a latch for retaining said member in engagement with said switching means thereby maintaining said contacts in closed condition;
    electromagnetic solenoid means which when energized releases said latch;
    means including an electronic dryness sensing circuit having a plurality of electronic components interconnected by a circuit board for energizing said electromagnetic solenoid means when said load reaches said predetermined level of dryness; and
    a housing supporting said switch means, said member, said latch and said electromagnetic solenoid means, said housing including said circuit board as one wall thereof.

2. A dryer control for automatically deenergizing drying means, said dryer means including a motor for agitating said load and a heater for accelerating the drying of said load, said control comprising:
    switch means including separate contacts for energizing said motor and said heater, said switch means further including respective spring means for biasing said contacts to an open position;
    a member which is manually movable into engagement with said switch means for closing said contacts against the bias of the spring means, said member being manually orientable to close only the motor energizing contacts thereby to provide agitation of said load without heating thereof;
    a latch for retaining said member in engagement with said switch means thereby maintaining said contacts in closed condition;
    electromagnetic means which when energized releases said latch;
    electrodes for contacting said load thereby to provide a current path the resistance of which varies as a function of the dryness of said load;
    means interconnected with said electrodes for providing a voltage which varies as a function of the dryness of said load;
    a capacitor for integrating said voltage; and
    means for energizing said electromagnetic means when the integrated voltage reaches a predetermined level.

3. A dryer control as set forth in claim 2 including means for disconnecting said electrodes and for charging said capacitor at a predetermined rate when said motor is energized and said heater is deenergized, whereby said motor is deenergized after a predetermined interval independently of the dryness of said load.

4. A dryer control as set forth in claim 2 wherein said means for energizing said electromagnetic means includes a silicon controlled rectifier which, when triggered, energizes said electromagnetic means and includes also a device having avalanche type break down characteristics for triggering said silicon controlled rectifier when the voltage on said capacitor reaches said predetermined level.

5. A dryer control as set forth in claim 4 wherein said device is a neon bulb.

6. A dryer control as set forth in claim 5 including a transistor, said neon bulb being connected to the base terminal of said transistor for forward biasing said transistor when the voltage on said capacitor reaches said preselected level and wherein the emitter terminal of said transistor is connected to the gate terminal of said silicon controlled rectifier for triggering said rectifier when said transistor is forward biased.

7. A dryer control for automatically de-energizing drying means when a load being dried reaches a predetermined level of dryness, said control comprising:
    frame means;
    switch means supported on said frame means, said switch including contacts which energize said drying means when closed, said switch means further including spring means for biasing said contacts to an open position;
    an elongated plunger slidable longitudinally between respective first and second positions relative to said frame means;
    a switch operating member slidable longitudinally with respect to said plunger between respective first and second positions relative to said plunger, said member being in engagement with said switch means for closing said contacts against the bias of said spring means when said plunger and said member are in their respective second positions;
    a latch carried by said plunger for retaining said switch operating member in its respective second position relative to said plunger thereby maintaining said contacts in closed condition when said plunger is in its respective second position;

electromagnetic means which when energized releases said latch; and means responsive to the dryness of said load for energizing said electromagnetic means when said load reaches said predetermined level of dryness thereby to release said latch and deenergize said drying means.

8. A dryer control as set forth in claim 7 wherein said latch is supported on said plunger by a carrier member and thereis a lost-motion connection between said plunger and said carrier member and wherein said control includes means carried by said plunger for releasing said latch when said plunger is moved towards its respective first position within the movement permitted by said lost-motion connection.

9. A dryer control as set forth in claim 7 further comprising:

spring means for urging said plunger toward its respective first position relative to said frame; and a second latch mounted on said frame for retaining said plunger in its second position, said second latch including a surface engageable by said switch operating member in moving from its second to its first position relative to said plunger for releasing said second latch whereby release of the first said latch in response to drying of said load allows said switch operating member to move from its first to its second position thereby deenergizing said drying means and also thereby releasing said second latch permitting said plunger to be returned to its first position by the respective spring means for resetting said first latch.

10. A dryer control as set forth in claim 9 wherein said second latch has a first arm portion extending generally along said plunger and including a sear surface for engaging and retaining said plunger in its second position and has also a second arm portion extending transversely of said first arm portion and wherein said control includes a compression spring one end of which urges said plunger towards its first position and the other end of which bears against said second arm portion of said second latch for urging said first arm portion into engagement with said plunger.

11. A dryer control as set forth in claim 10 wherein said electromagnetic means for releasing the first said latch comprising a solenoid having a movable operating core which is slidable generally longitudinally of said plunger and which is connected to said latch whereby said core moves longitudinally with said plunger with said core being nearly seated in said solenoid when said plunger is in its respective second position whereby a substantial force is available to release the first said latch when said solenoid is energized.

12. A dryer control as set forth in claim 7 wherein said plunger comprises a rotatable shaft and wherein said control includes a rheostat for preselecting the dryness level at which said electromagnetic means is energized to deenergize said drying means and wherein said shaft is coupled to said rheostat for transmitting rotational motion thereto while permitting said shaft to slide longitudinally with respect to said rheostat.

13. A dryer control as set forth in claim 7 wherein said drying means includes a motor for agitating said load and a heater for accelerating the drying of said load and wherein said switch means includes separate contacts for energizing said motor and said heater and wherein said switch operating member can be manually oriented to close only the motor energizing contacts thereby to provide agitation of said load without heating thereof.

14. A dryer control as set forth in claim 13 wherein said plunger comprises a rotatable shaft and said switch operating member is rotatable with said shaft; wherein said switch means includes respective followers adapted to engage said switch operating member for operating said separate contacts; and wherein said switch operating member includes a recess which, at a preselected angular position of said switch operating member, receives the follower which operates the heater energizing contacts thereby to prevent closing thereof, whereby said motor may be energized without energizing said heater.

15. A dryer control as set forth in claim 14 including a detent for retaining said shaft and said switch operating member in said preselected angular position.

16. A dryer control as set forth in claim 13 wherein said drying means includes a motor for agitating said load and a heater for accelerating the drying of said load and wherein said control includes a thermostatic switch for maintaining the energization of said motor until said load cools to a preselected temperature level following deenergization of said heater by said dryness responsive means.

17. A dryer control as set forth in claim 16 including a switch interconnected with said thermostatic switch for deenergizing said motor during said cooling of said load and means responsive to movement o fsaid plunger within the movement permitted by said lost-motion connection when said plunger is in its respective first position for opening said switch.

References Cited

UNITED STATES PATENTS

| | | | |
|---|---|---|---|
| 1,052,595 | 2/1913 | Lanphier | 335—174 |
| 3,330,047 | 7/1967 | Rodgers | 34—45 |
| 3,343,272 | 9/1967 | Janke et al. | 34—45 |

FREDERICK L. MATTESON, JR., *Primary Examiner.*

A. D. HERRMANN, *Assistant Examiner.*